July 25, 1967 D. J. TOMPOS ET AL 3,332,279
AUTOMATIC SHEET MOISTURE PROBE POSITIONER
Original Filed April 12, 1962 2 Sheets-Sheet 1
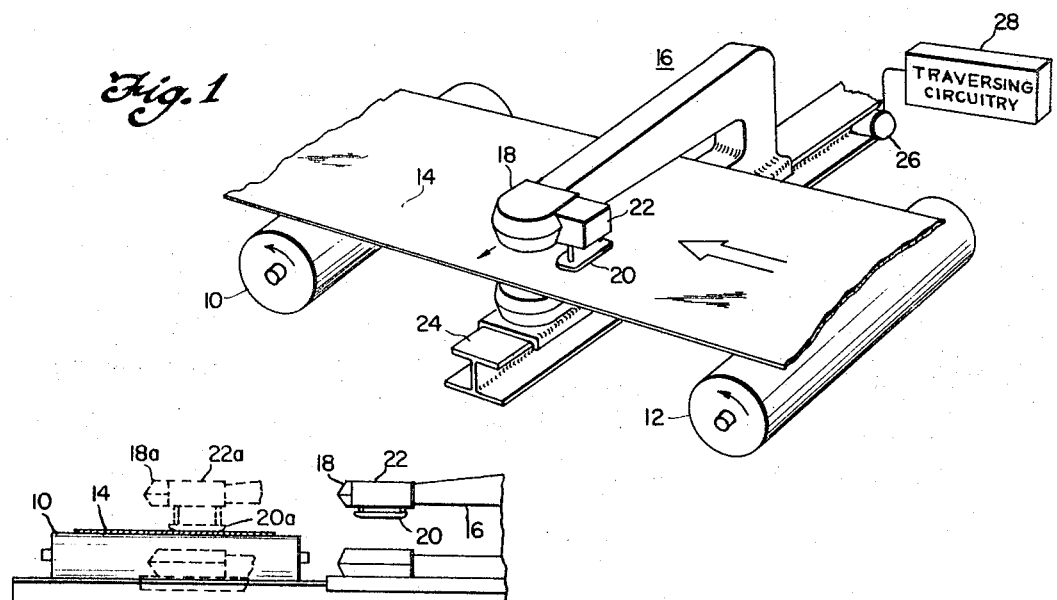
Fig. 1
Fig. 2
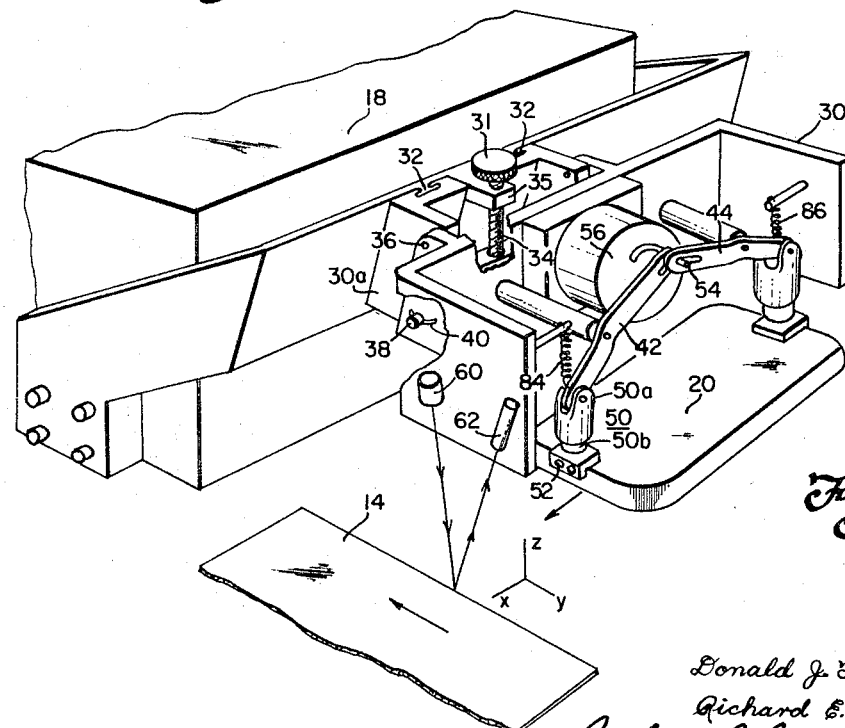
Fig. 3
Inventors
Donald J. Tompos
Richard E. Bach
By Anthony D. Cennamo
ATTORNEY July 25, 1967  D. J. TOMPOS ETAL  3,332,279
AUTOMATIC SHEET MOISTURE PROBE POSITIONER
Original Filed April 12, 1962  2 Sheets-Sheet 2
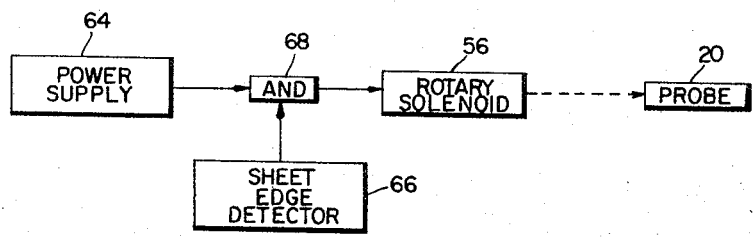
*Fig. 5*
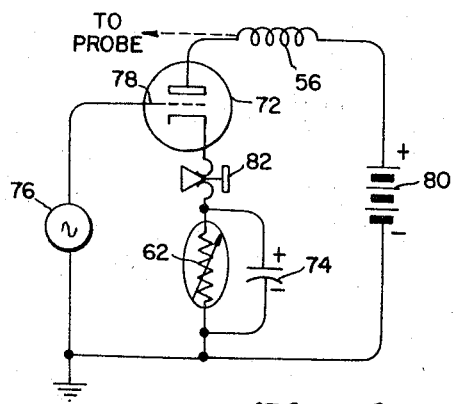
*Fig. 6*
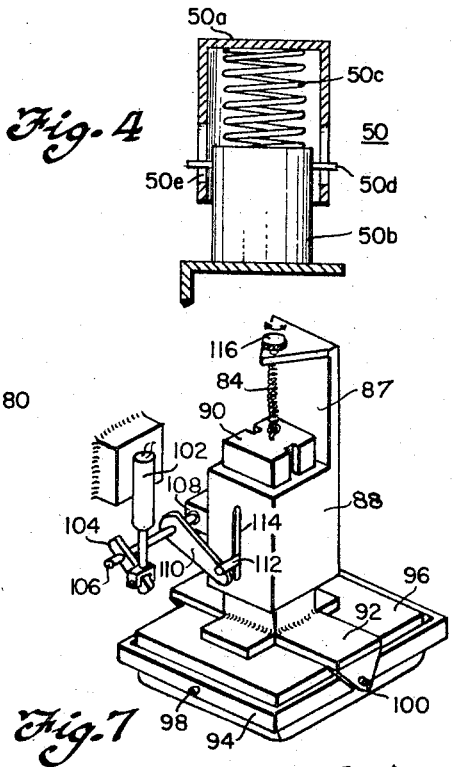
*Fig. 4*
*Fig. 7*
Inventors
Donald J. Tompos
Richard E. Bach
By Anthony D. Cennamo
ATTORNEY

United States Patent Office 3,332,279
Patented July 25, 1967

3,332,279
AUTOMATIC SHEET MOISTURE PROBE POSITIONER
Donald J. Tompos, Worthington, and Richard E. Bach, Hilliard, Ohio, assignors to Industrial Nucleonics Corporation, a corporation of Ohio
Continuation of application Ser. No. 187,106, Apr. 12, 1962. This application Apr. 2, 1964, Ser. No. 357,863
8 Claims. (Cl. 73—73)

This is a continuation of our copending application Ser. No. 187,106, filed Apr. 12, 1962, now abandoned, entitled, "Moisture Gauge With an Automatically Retracting Measuring Probe."

This invention relates generally to industrial gauges and more particularly to improved apparatus for facilitating the mounting of the sensing element of a moisture gauge.

The measurement of moisture content of paper sheet or textile webs has been attempted by inserting probes responsive to the moisture into the sheet or otherwise placing them in close proximity thereto. Quite often these moisture gauges are constructed to scan back and forth across the sheet while measuring. During this time, the probe must be continuously maintained against the sheet to optimize the signal-to-noise ratio. In addition, the gauge frequently must be moved off-sheet for maintenance and standardization. When the on-sheet scan is initiated the probe must be high enough to miss the edge of the sheet to prevent tearing of the same and assume its normal measuring relationship with the sheet.

The present invention provides a novel mounting arrangement whereby the probe is elevated when off-sheet but is automatically lowered onto the sheet and maintained at a predetermined pressure thereagainst during a measuring scan. The probe is mounted to follow the sheet contour which may vary considerably from one process to another. Fail-safe features are provided to prevent contact with the sheet in the event of a power failure or other cessation of optimum operating conditions.

Accordingly, it is a primary object of the present invention to provide a moisture gauge mounting which substantially eliminates sheet breaks.

It is another object of the present invention to provide a moisture gauge that provides a higher signal-to-noise ratio than similar devices used heretofore.

It is yet another object of the present invention to provide a moisture gauge that is simple and inexpensive to construct and economical to maintain.

It is still another object of the present invention to provide a moisture gauge that is completely fail-safe in operation.

These and other objects and advantages will become more apparent when the following description is taken in accordance with the drawings, in which:

FIG. 1 is a perspective view of an industrial gauge mounting comprising a preferred embodiment of the present invention;

FIG. 2 is a partial side elevation of the gauge mounting shown in FIG. 1;

FIG. 3 is an enlarged perspective view showing constructional details of a probe mounting apparatus constructed in accordance with the present invention;

FIG. 4 is a sectional view of a preferred shock mount used in the apparatus shown in FIG. 3;

FIG. 5 is a diagrammatic view of an actuating system for the probe mount shown in FIG. 3;

FIG. 6 is a schematic circuit diagram illustrating a sheet edge detector used in the system of FIG. 4; and FIG. 7 is an alternative embodiment of the present invention.

With reference to the drawings, and particularly to FIG. 1, a portion of a papermaking process includes a pair of rolls 10 and 12 for supporting a paper sheet 14 for travel in the direction indicated by the large arrow. A scanning U-bracket 16 carries a measuring head 18 to the side of which is mounted a moisture responsive probe 20 suspended from a bracket 22. The U-bracket 16 is adapted to move back and forth across the sheet 14 on a rail 24 by means of a motor 26 and traversing circuitry 28. The head 18 may contain suitable areal density measuring elements such as a radiation source and detector such as described in U.S. Patent No. 3,000,438 issued Sept. 19, 1961, to Frank M. Alexander. Otherwise the probe and support bracket 22 could be the only elements supported by the U-bracket 16.

Referring briefly to FIG. 2, the off-sheet position of the U-bracket 16 is illustrated. An alternative on-sheet position is shown in dotted outline and corresponding elements are labeled with the same reference number suffixed with a lower case *a*. The present invention provides for retraction of the moisture probe 20 into its mounting bracket when the gauge is positioned in the off-sheet position. However, in the on-sheet measuring position the probe is lowered onto the sheet 14 in position 20a. Pressure is maintained by the probe against the paper sheet 14 and a novel suspension system enables the probe to "follow" the normal sheet movements in flutter, warping, etc.

Typical constructional details are revealed in FIG. 3. With reference to FIG. 3, the probe 20 comprises a generally rectangular plate supported by a carriage 30. The carriage 30 is connected to a section 30a which is slidably movable in ways 32. An adjusting knob 31 rotates a screw 34 threadingly engaging a stationary projecting member 35. The other end of screw 34 supports the carriage section 30a. The attitude of the carriage 30 about the *x*-axis is controlled by pivotally pinning the carriage at 36 and tightening a locking bolt 38 extending through an arcuate slot 40 into the carriage section 30a.

The probe suspension system includes a pair of scissor arms 42, 44 pivotally mounted on the carriage 30. The lower end of the arms terminate in a shock absorbing member as at 50 shown in detail in FIG. 4. The shock absorbers comprise an upper member 50a pinned to its associated scissor arm and a lower cylindrical member 50b which is separated from the upper member by a compression spring 50c. The lower member slides inside the upper member and carries a retaining pin 50d in side slots 50e. The lower members 50b are fastened to opposite ends of the probe 20 as at 52. The upper operating ends of the scissor arms 42 and 44 are slotted to receive a pin 54 extending from a rotary solenoid 56. The solenoid is fastened securely to the carriage 30. It may be observed that the shock absorbers permit the probe a limited third degree of freedom about the *y*-axis.

To the forward edge of the carriage 30 is mounted a sheet edge sensing apparatus which includes a light source 60 and a photocell 62. The light and photocell units are mounted to define an optical path to and from the traveling sheet 14 as indicated by the ray diagram shown. Further details of this portion of the system will now be described with reference to FIGS. 5 and 6. In FIGS. 5 and 6, both a power supply 64 and a sheet edge detector 66 energize an and gate 68. The output of the and gate 68 energizes the rotary solenoid 56 which is mechanically linked to the probe 20. The sheet edge detector 66 comprises a triode 72 which is self-biased by means of the photocell 62 and an electrolytic capacitor 74. An A.C. signal generator 76 may be connected to the control grid 78 and a battery 80 used to supply operating potential across the triode. A safety switch 82 may be connected in series with the cathode return to bypass the control function of the photocell 62. Alternatively, a thyratron-actuated control circuit could be used to provide improved power handling capabilities.

The operation of the present invention proceeds as follows: As the carriage 30 approaches the edge of the sheet 14 no light energy is reflected from the source 60 into the photocell 62 and the dark resistance thereof is quite high. Therefore tube 72 is biased into cutoff. The rotary solenoid 56 is deenergized and a pair of extension springs 84, 86 act as biasing means to urge the outer reaches of the scissor arms 42 and 44 upwardly as shown. As soon as the edge of the sheet 14 is reached light impinging on the photocell 62 decreases its resistance and allows A.C. conduction of the triode. Solenoid 56 is energized by the signal current and the actuating pin 54 moves counter-clockwise to urge the outer reaches of the scissor arms downwardly. The photocell 62 thus functions as an actuating means to actuate the solenoid 56. The solenoid 56 in turn functions as an operating means operating when actuated to override the biasing action of the springs 84, 86 and force the probe 20 against the sheet 14.

The probe 20 thus rides across the sheet 14 and exerts a pressure thereon in accordance with the spring constant of the compression springs 50c and the amount of initial vertical displacement set in by the adjustment at 31. It should be pointed out that the system of the present invention is fail-safe in that failure of any power source, or component of the photocell system is immediately accompanied by removal of the probe from the surface of the paper. Moreover, the probe may be manually retracted at any time by means of the safety switch 82.

With reference to FIG. 7, the construction shown therein provides a system which is somewhat more adaptable to certain processes wherein the product to be measured fluctuates to the extent that the probes described hereinabove cannot respond. The significant improvement comprises a counterbalancing spring 84 which tends to partially oppose the weight of the probe acting downwardly. The spring is attached to an upstanding bracket 86 connected to a stationary frame member 88. The spring is also connected to a movable core 90 slidably carried in the frame member 88. The base of the core 90 is fastened to a cross-shaped mounting bracket 92 which serves to support a gimbal frame 94. The probe 96 is pivotally mounted at 98 to the gimbal frame 94 while a pivot 100 joins the gimbal frame to the mounting bracket 92.

A linear actuating solenoid 102 is used to drive the probe assembly by means of a crank arm 104 and a drive axle 106 supported in a bearing block 108. A lever arm 110 fastened to the axle 106 engages a pin 112 which extends from the core member 90 through a vertical slot 114 provided in the side of the stationary frame member 88.

Briefly, the operation of this embodiment is as follows: The probe rides on the sheet in the position shown with a pressure determined by the tension set into the spring 84 by a control knob 116. To increase the probe pressure the tension in the spring is decreased to allow more of the probe weight to be exerted on the sheet. The probe is lifted from the sheet by deenergizing the solenoid 102. The lever arm 110 shoves the pin 102 up in the slot 114 carrying with it the core 90 and probe assembly.

Although certain and specific embodiments have been shown and described herein, many modifications may be made without departing from the true spirit and scope of the invention as set forth in the appended claims.

What is claimed is:

1. Apparatus for sensing the moisture content of a continuous traveling sheet having the length in the traveling direction and an edge along the side in the traveling direction, said apparatus comprising:
    a probe for engaging the surface of said sheet to develop a signal indicative of said moisture content,
    a carriage for mounting said probe above said sheet,
    means for moving said carriage across said sheet and said edge with respect to said traveling direction,
    edge detecting means for generating a signal when said probe is over said sheet, and
    means for lowering said probe from said carriage whenever said carriage moves above said sheet comprising
        a pair of downwardly extending scissors arms each connected together at a common junction and pivotally mounted on said carriage at a point intermediate said common connection and the end of said arm,
        a resilient member connected between the end of each scissors arm and each end of said probe, and
        an electrical solenoid energized by said edge detecting means signal for moving said common junction upwardly relative to said sheet.

2. Apparatus for sensing the moisture content of a continuous traveling sheet having the length in the traveling direction and an edge along the side in the traveling direction, said apparatus comprising:
    a probe for engaging the surface of said sheet to develop a signal indicative of said moisture content,
    a carriage for mounting said probe above said sheet,
    means for moving said carriage across said sheet and said edge with respect to said traveling direction,
    edge detecting means for generating a signal when said probe is over said sheet, and
    means for lowering said probe from said carriage whenever said carriage moves above said sheet comprising
        a housing having a vertically extending shaft and an upstanding bracket positioned over said shaft,
        a core member slidably mounted in said housing and having a pin projecting outside said housing,
        a gimbal platform connected between the lower end of said core member and said probe,
        said gimbal platform providing at least one axis of rotation for said probe extending in the direction of movement of said carriage,
        a solenoid energized by said edge detecting means signal and connected to said pin to move said core member in said housing from a first position to a second lower position whereby said probe follows the contour of said sheet, and
        tension spring means connected between said core member and said upstanding bracket for partially relieving the weight of said probe.

3. A moisture gauge for measuring the moisture in a continuous traveling sheet having opposite edges in the traveling direction, said gauge scanning across said sheet and at times moving off said sheet for adjustment,
    a carriage,
    a moisture responsive probe providing an indication of said moisture when adjacent to said sheet,
    means for mounting said probe on said carriage away from the plane of said sheet,
    means for moving said carriage across said sheet to scan said sheet with said probe and to move said probe off-sheet,
    edge detecting means responsive to the movement of said probe from an off-sheet position across one of said edges to indicate when said probe is over said sheet, and
    means coupled to said edge detecting means for automatically moving said probe toward the plane of said sheet when said edge detecting means indicates that said probe is between said sheet edges.

4. A moisture gauge as set forth in claim 3 wherein said edge detecting means is mounted on said carriage for providing a signal whenever said probe is over said sheet.

5. A moisture gauge as set forth in claim 3 wherein said edge detecting means includes
a lamp mounted on said carriage for beaming light toward the surface of said sheet, and a photocell detector responsive to light reflected from said surface for indicating when said probe is over said sheet.

6. A moisture gauge for measuring the moisture in a continuous traveling sheet having opposite edges in the traveling direction, said gauge scanning across said sheet and at times moving off said sheet for adjustment,
a carriage,
a moisture responsive probe providing an indication of said moisture when adjacent to said sheet,
means for mounting said probe on said carriage away from the plane of said sheet,
means for moving said carriage across said sheet to scan said sheet with said probe and to move said probe off-sheet,
edge detecting means responsive to the movement of said probe from an off-sheet position across one of said edges to indicate when said probe is over said sheet,
means coupled to said edge detecting means for automatically moving said probe toward the plane of said sheet when said edge detecting means indicates that said probe is between said sheet edges, and
means for raising said probe from said sheet when said edge detecting means indicates that said probe is withdrawn off said sheet.

7. The apparatus, as defined in claim 3, wherein said edge detecting means is a photoelectric edge detecting means mounted on said carriage for generating a signal from light reflected from said sheet when said probe is over said sheet for actuating said probe automatic moving means.

8. The apparatus, as defined in claim 6, wherein said edge detecting means is a photoelectric edge detecting means mounted on said carriage for generating a signal from light reflected from said sheet when said probe is over said sheet for actuating said probe automatic moving means.

References Cited
UNITED STATES PATENTS

| | | | |
|---|---|---|---|
| 1,623,436 | 4/1927 | Peschl | 342—65 XR |
| 2,294,437 | 9/1942 | Allen et al. | 248—184 |
| 2,810,316 | 10/1957 | Snyder | 250—219 |
| 3,000,438 | 9/1961 | Alexander | 162—259 |
| 3,038,329 | 6/1962 | Miller | 73—159 XR |
| 3,143,886 | 8/1964 | Lippke | 73—73 XR |
| 3,179,800 | 4/1965 | McNamara | 250—83.3 |

RICHARD C. QUEISSER, *Primary Examiner.*

J. J. SMITH, *Assistant Examiner.*